United States Patent
Iriyama et al.

(10) Patent No.: US 8,865,355 B2
(45) Date of Patent: Oct. 21, 2014

(54) SOLID ELECTROLYTE MATERIAL AND LITHIUM BATTERY

(75) Inventors: Yasutoshi Iriyama, Hamamatsu (JP); Shota Kumazaki, Hamamatsu (JP); Murugan Ramaswamy, Hamamatsu (JP); Yutaka Hirose, Susono (JP)

(73) Assignees: National University Corporation Shizuoka University, Shizuoka (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/699,902

(22) PCT Filed: Jul. 6, 2011

(86) PCT No.: PCT/JP2011/065489
§ 371 (c)(1),
(2), (4) Date: Nov. 26, 2012

(87) PCT Pub. No.: WO2012/005296
PCT Pub. Date: Jan. 12, 2012

(65) Prior Publication Data
US 2013/0084505 A1   Apr. 4, 2013

(30) Foreign Application Priority Data
Jul. 7, 2010 (JP) ................................. 2010-154639

(51) Int. Cl.
*H01M 10/054* (2010.01)
*H01M 10/056* (2010.01)
*H01M 10/0561* (2010.01)
*H01M 10/0562* (2010.01)
*C04B 35/486* (2006.01)
*C04B 35/626* (2006.01)
(Continued)

(52) U.S. Cl.
CPC ........ *H01M 10/0562* (2013.01); *H01M 10/054* (2013.01); *H01M 10/056* (2013.01); *C04B 35/486* (2013.01); *C04B 35/6262* (2013.01);
(Continued)

(58) Field of Classification Search
CPC ............ H01M 10/054; H01M 10/056; H01M 10/0561; H01M 10/0562
USPC .......................................... 429/319, 322, 323
See application file for complete search history.

(56) References Cited

U.S. PATENT DOCUMENTS

2007/0148553 A1* 6/2007 Weppner ....................... 429/322
2009/0068563 A1   3/2009 Kanda et al.
(Continued)

FOREIGN PATENT DOCUMENTS

JP   A-2009-238739   10/2009
JP   A-2009-245913   10/2009
(Continued)

OTHER PUBLICATIONS

Murugan et al., Angew. Chem. Int. Ed., 2007, 46, p. 7778-7781, Published online Sep. 5, 2007.*

Primary Examiner — Jeremiah Smith
(74) Attorney, Agent, or Firm — Oliff PLC

(57) ABSTRACT

A main object of the present invention is to provide a Li—La—Zr—O-based solid electrolyte material having favorable denseness. The present invention solves the problem by providing a solid electrolyte material including Li, La, Zr, Al, Si and O, having a garnet structure, and being a sintered body.

7 Claims, 2 Drawing Sheets

(51) Int. Cl.
*H01B 1/12* (2006.01)
*H01M 6/18* (2006.01)
*H01M 10/052* (2010.01)

(52) U.S. Cl.
CPC ... *C04B 35/62645* (2013.01); *C04B 2235/3203* (2013.01); *C04B 2235/3217* (2013.01); *C04B 2235/3227* (2013.01); *C04B 2235/3418* (2013.01); *C04B 2235/604* (2013.01); *C04B 2235/6562* (2013.01); *C04B 2235/6565* (2013.01); *C04B 2235/6567* (2013.01); *C04B 2235/764* (2013.01); *H01B 1/122* (2013.01); *H01M 6/185* (2013.01); *H01M 10/052* (2013.01); *H01M 2300/0071* (2013.01); *Y02E 60/122* (2013.01)
USPC .......................... 429/322; 429/304; 429/319

(56) References Cited

U.S. PATENT DOCUMENTS

| | | | |
|---|---|---|---|
| 2009/0092903 A1* | 4/2009 | Johnson et al. | 429/322 |
| 2009/0226790 A1 | 9/2009 | Kanamura et al. | |
| 2010/0047696 A1 | 2/2010 | Yoshida et al. | |
| 2011/0244337 A1* | 10/2011 | Ohta et al. | 429/319 |

FOREIGN PATENT DOCUMENTS

| | | |
|---|---|---|
| JP | A-2010-40439 | 2/2010 |
| JP | A-2010-45019 | 2/2010 |
| JP | A-2010-102929 | 5/2010 |
| JP | A-2010-272344 | 12/2010 |
| WO | WO 2010/090301 A1 | 8/2010 |

* cited by examiner

SOLID ELECTROLYTE MATERIAL AND LITHIUM BATTERY

TECHNICAL FIELD

The present invention relates to an Li—La—Zr—O-based solid electrolyte material having favorable denseness.

BACKGROUND ART

In accordance with a rapid spread of information relevant apparatuses, communication apparatuses and the like such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

A liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

An Li—La—Zr—O-based solid electrolyte material has been known as a solid electrolyte material used for an all solid state lithium battery. For example, in Patent Literature 1, a ceramic material containing Li, La, Zr, O and Al is disclosed. In Patent Literature 2, a method for producing a solid electrolyte structure using a ceramic material having a crystal structure of a garnet type or a garnet-like type composed of Li, La, Zr and O, and containing Al as a particle of a solid electrolyte is disclosed. In Patent Literature 3, an all solid state lithium battery provided with a solid electrolyte containing ceramics having a crystal structure of a garnet type or a garnet-like type composed of Li, La, Zr and O is disclosed. Further, in Patent Literatures 4 and 5, a lithium battery provided with a buffer layer containing $Li_7La_3Zr_2O_{12}$ between a cathode layer and a sulfide solid electrolyte layer is disclosed. In Patent Literature 6, a lithium-containing garnet-type oxide having a basic composition of $Li_7La_3Zr_2O_{12}$ is disclosed.

CITATION LIST

Patent Literature

Patent Literature 1: U.S. Patent Application Publication No. 2010/0047696
Patent Literature 2: Japanese Patent Application Laid-Open (JP-A) No. 2009-238739
Patent Literature 3: JP-A No. 2010-045019
Patent Literature 4: JP-A No. 2009-245913
Patent Literature 5: JP-A No. 2010-040439
Patent Literature 6: JP-A No. 2010-102929

SUMMARY OF INVENTION

Technical Problem

There is a problem that when an Li—La—Zr—O-based solid electrolyte material contains Al, the denseness of the solid electrolyte material deteriorates. The present invention has been made in view of the above-mentioned actual circumstances, and a main object thereof is to provide an Li—La—Zr—O-based solid electrolyte material having favorable denseness.

Solution to Problem

In order to solve the problem, the present invention provides a solid electrolyte material comprising Li, La, Zr, Al, Si and O, having a garnet structure, and being a sintered body.

The present invention allows a solid electrolyte material having favorable denseness by containing Si even in the case of containing Al.

In the present invention, the ratio of the Li, the La and the Zr is preferably Li:La:Zr=7:3:2 on a molar basis.

In the present invention, Li ion conductance is preferably $2.0 \times 10^{-4}$ S/cm or more. The reason therefor is to allow a solid electrolyte material with a higher Li ion conductance than $Li_7La_3Zr_2O_{12}$.

In the present invention, the ratio (Al/Si) of the content (% by weight) of the Al to the content (% by weight) of the Si is preferably within a range of 4.6 to 11.9. The reason therefor is to allow a solid electrolyte material with a further higher Li ion conductance.

Further, the present invention provides a lithium battery comprising a cathode active material layer containing a cathode active material, an anode active material layer containing an anode active material, and a solid electrolyte layer formed between the cathode active material layer and the anode active material layer, characterized in that the solid electrolyte layer contains the above-mentioned solid electrolyte material.

According to the present invention, the use of the solid electrolyte material allows a lithium battery having a dense solid electrolyte layer.

Advantageous Effects of Invention

The present invention produces the effect such as to allow an Li—La—Zr—O-based solid electrolyte material having favorable denseness.

DESCRIPTION OF EMBODIMENTS

Figure 1:
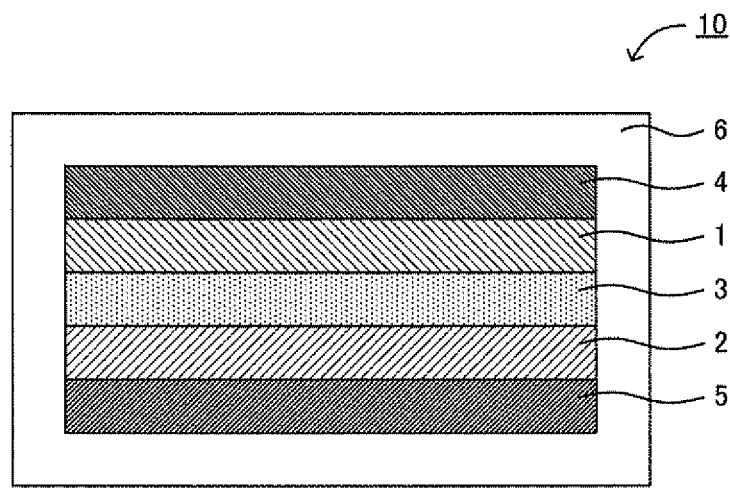
FIG. 1 is a schematic cross-sectional view showing an example of a lithium battery of the present invention.

A solid electrolyte material and a lithium battery of the present invention are hereinafter described in detail.

A. Solid Electrolyte Material

A solid electrolyte material of the present invention is first described. The solid electrolyte material of the present invention comprises Li, La, Zr, Al, Si and O, has a garnet structure, and being a sintered body.

The present invention allows a solid electrolyte material having favorable denseness by containing Si even in the case of containing Al. If the solid electrolyte material has favorable denseness, there are the advantages of, such as, being capable of contributing to an improvement in Li ion conductivity and being capable of contributing to an improvement in mechanical strength. For example, high Li ion conductivity allows the solid electrolyte material appropriate for achieving higher output of a battery. Further, for example, high mechanical strength allows the solid electrolyte material appropriate for achieving higher durability of a battery.

Further, as described in the after-mentioned examples, Al contained in the solid electrolyte material is conceived to have the function of improving crystallinity while having the problem of bringing a deterioration in denseness. On the contrary, in the present invention, the addition of Si as well as Al to the solid electrolyte material allows the solid electrolyte material having favorable denseness.

One of the characteristics of the solid electrolyte material of the present invention is to comprise Li, La, Zr, Al, Si and O. Further, the solid electrolyte material of the present invention is ordinarily an oxide solid electrolyte material. The composition ratio of the solid electrolyte material of the present invention may be determined in the following manner. First, the solid electrolyte material is melted in a mixed fusing agent of sodium carbonate and boric acid, and next this melt is dissolved in dilute nitric acid to thereby obtain a solution for evaluation. The use of this solution for evaluation allows the composition of Li to be determined by an atomic absorption analysis method, and allows the composition of Si, Al and other elements to be determined by an ICP emission spectral analysis method.

Further, the ratio of Li, La and Zr in the solid electrolyte material is not particularly limited if it is a ratio for allowing the solid electrolyte material having a garnet structure, but is ordinarily Li:La:Zr=7:3:2 on a molar basis. However, this ratio may fluctuate more or less, so that 'Li:La:Zr=7:3:2' signifies Li:La:Zr=7:2.8 to 3.2:1.8 to 2.2. However, insertion and desorption of Li are not considered.

Further, the ratio of Al in the solid electrolyte material is not particularly limited and is preferably within a range of 0.1% by weight to 2.2% by weight, for example. The reason therefor is that too small ratio of Al brings a possibility of not allowing the solid electrolyte material with high crystallinity while too large ratio of Al brings a possibility of greatly deteriorating the denseness of the solid electrolyte material. On the other hand, the ratio of Si in the solid electrolyte material is not particularly limited and is preferably within a range of 0.005% by weight to 1.00% by weight, for example.

Further, in the present invention, the ratio (Al/Si) of the content (% by weight) of Al to the content (% by weight) of Si is not particularly limited. Above all, in the present invention, the value of Al/Si is preferably a value for allowing the solid electrolyte material having Li ion conductance more than Li ion conductance ($2.0 \times 10^{-4}$ S/cm) of $Li_7La_3Zr_2O_{12}$. The reason therefor is to allow the solid electrolyte material appropriate for achieving higher output of a battery. The value of Al/Si is preferably within a range of 0.6 to 170, and more preferably within a range of 2 to 150, for example. Further, Li ion conductance (room temperature) of the solid electrolyte material of the present invention is preferably higher; for example, preferably $8.0 \times 10^{-5}$ S/cm or more, and more preferably $2.0 \times 10^{-4}$ S/cm or more.

The ratio of oxygen (O) in the solid electrolyte material is basically determined so as to satisfy the electroneutrality principle in relation with each metal ion, and oxygen deficiency and oxygen excess are occasionally caused depending on a synthesis method.

Further, one of the characteristics of the solid electrolyte material of the present invention is to have a garnet structure. The garnet structure in the present invention includes not merely a strict garnet structure but also a garnet-like structure. It may be specified by confirming a peak position of X-ray diffraction (XRD) that the solid electrolyte material has the garnet structure. For example, in XRD measurement using a CuKα ray, if the solid electrolyte material has a peak in a position of 2θ=17°, 26°, 28°, 31°, 34°, 38°, 43°, 51°, 52° and 53°, it may be specified that the solid electrolyte material is of the garnet structure.

Further, the other characteristic of the solid electrolyte material of the present invention is being a sintered body. The present invention allows a dense sintered body by containing Si as well as Al. The shape of the solid electrolyte material of the present invention is not particularly limited if it is a shape capable of being existent as a sintered body; examples thereof include a pellet shape and a thin-film shape. Further, the thickness of the solid electrolyte material of the present invention varies with uses of the solid electrolyte material; in the case of being used as the solid electrolyte layer of a lithium battery, the thickness thereof is preferably within a range of 0.1 μm to 1000 μm, for example.

Further, the uses of the solid electrolyte material of the present invention are not particularly limited and examples thereof include a lithium battery use and a metal-air battery use. Further, in the case of being used for a metal-air battery, the solid electrolyte material of the present invention may be disposed as a separator between a cathode active material layer and an anode active material layer. In this case, it may be used as a separator for preventing gas (such as $O_2$ gas) from permeating.

Next, a method for producing the solid electrolyte material of the present invention is described. The method for producing the solid electrolyte material of the present invention is not particularly limited if it is a method for allowing the solid electrolyte material. Examples of the method for producing the solid electrolyte material include a producing method comprises a preparation step of preparing a raw material composition having Li, La, Zr, Al and Si, and a synthesis step of synthesizing the solid electrolyte material having a garnet structure and being a sintered body by firing the raw material composition.

In the preparation step, the raw material composition has Li, La, Zr, Al and Si. Examples of a Li source include $LiOH.H_2O$, $Li_2CO_3$, $CH_3COOLi$ and $LiNO_3$. Examples of an La source include $La(OH)_3$ and $La_2O_3$. Examples of a Zr source include $ZrO_2$. Examples of an Al source include $Al_2O_3$. Examples of a Si source include $SiO_2$. The composition of the solid electrolyte material of the present invention may be controlled by adjusting the ratio of the metal sources. Further, the ratio of each of the metal sources in the raw material composition is preferably adjusted properly in consideration of a factor such as the influence of volatilization.

In the synthesis step, the solid electrolyte material is synthesized by firing the raw material composition. The firing environment is not particularly limited and is preferably an oxygen-containing environment. The reason therefor is to allow an oxygen source of the solid electrolyte material. Examples of the oxygen-containing environment include an atmospheric environment. Further, the pressure during firing may be under an atmospheric pressure or under a reduced pressure. In addition, the heating temperature during firing may be a temperature higher than the crystallization temperature of the intended solid electrolyte material, and is preferably within a range of 1200° C. to 1250° C., for example. Further, the firing time is within a range of 24 hours to 48 hours, for example. Examples of the firing method include a method using a firing furnace.

B. Lithium Battery

Next, a lithium battery of the present invention is described. The lithium battery of the present invention is a lithium battery comprising a cathode active material layer containing a cathode active material, an anode active material layer containing an anode active material, and a solid electrolyte layer formed between the cathode active material layer and the anode active material layer, characterized in that the solid electrolyte layer contains the above-mentioned solid electrolyte material.

According to the present invention, the use of the solid electrolyte material allows a lithium battery having a dense solid electrolyte layer.

FIG. 1 is a schematic cross-sectional view showing an example of a lithium battery of the present invention. A lithium battery 10 in FIG. 1 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. The present invention is greatly characterized in that the solid electrolyte layer 3 contains the solid electrolyte material described in the 'A. Solid electrolyte material'.

The lithium battery of the present invention is hereinafter described in each constitution.

1. Solid Electrolyte Layer.

A solid electrolyte layer in the present invention is first described. The solid electrolyte layer in the present invention contains the above-mentioned solid electrolyte material. The range of the thickness of the solid electrolyte layer is preferably the same as the range of the thickness of the solid electrolyte material. Further, the solid electrolyte layer in the present invention may be composed of only the solid electrolyte material, or further contain another solid electrolyte material.

2. Cathode Active Material Layer

Next, a cathode active material layer in the present invention is described. The cathode active material layer in the present invention is a layer containing at least a cathode active material, and may contain at least one of a conductive material, a solid electrolyte material and a binder, as required. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer in the present invention may further contain a conductive material. The addition of the conductive material allows conductivity of the cathode active material layer to be improved. Examples of the conductive material include acetylene black, Ketjen Black and carbon fiber. Further, the cathode active material layer may further contain a solid electrolyte material. The addition of the solid electrolyte material allows Li ion conductivity of the cathode active material layer to be improved. Examples of the solid electrolyte material include an oxide solid electrolyte material and a sulfide solid electrolyte material. Further, the cathode active material layer may further contain a binder. Examples of the binder include a fluorine-containing binder such as polytetrafluoroethylene (PTFE). The thickness of the cathode active material layer is preferably within a range of 0.1 μm to 1000 μm, for example.

3. Anode Active Material Layer

Next, an anode active material layer in the present invention is described. The anode active material layer in the present invention is a layer containing at least an anode active material, and may contain at least one of a conductive material, a solid electrolyte material and a binder, as required. Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

A conductive material, a solid electrolyte material and a binder used for the anode active material layer are the same as the case of the above-mentioned cathode active material layer. The thickness of the anode active material layer is preferably within a range of 0.1 μm to 1000 μm, for example.

4. Other Constitutions

The lithium battery of the present invention comprises at least the above-mentioned solid electrolyte layer, cathode active material layer, and anode active material layer, ordinarily further comprising a cathode current collector for performing current collecting of the cathode active material layer and an anode current collector for performing current collecting of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. The thickness, shape and the like of the cathode current collector and the anode current collector are preferably selected properly in accordance with factors such as uses of a lithium battery. A battery case of a general lithium battery may be used for a battery case used for the present invention. Examples of the battery case include a battery case made of SUS.

5. Lithium Battery

The lithium battery of the present invention may be a primary battery or a secondary battery, and preferably a secondary battery among them. The reason therefor is to be repeatedly chargeable and dischargeable and be useful as a car-mounted battery, for example. Examples of the shape of the lithium battery of the present invention include a coin shape, a laminate shape, a cylindrical shape and a rectangular shape. A method for producing the lithium battery of the present invention is not particularly limited if it is a method for allowing the above-mentioned lithium battery, and the same method as a method for producing a general lithium battery may be used. Examples thereof include a method such that a material composing a cathode active material layer, a material composing a solid electrolyte layer, and a material composing an anode active material layer are sequentially pressed to thereby produce a power generating element, and this power generating element is stored inside a battery case, which is crimped.

The present invention is not limited to the above-mentioned embodiments. The above-mentioned embodiments are exemplification, and any is included in the technical scope of the present invention if it has substantially the same constitution as the technical idea described in the claims of the present invention and offers similar operation and effect thereto.

EXAMPLES

Hereinafter, the present invention is described more specifically while showing examples.

Example 1

An Li source (LiOH.H$_2$O), an La source (La$_2$O$_3$), a Zr source (ZrO$_2$), an Al source (Al$_2$O$_3$) and an Si source (SiO$_2$) were prepared as a starting material. Next, the Li source, the La source, the Zr source, the Al source and the Si source were added and mixed by predetermined amounts. Thereby, a raw material composition was obtained.

Thereafter, the raw material composition was molded into pellets and thermally-treated (sintered) under an atmospheric pressure and an aerial atmosphere. Specifically, the pelletized raw material composition were first heated up to 900° C. in 15 hours, retained at 900° C. for 12 hours, and thereafter cooled down to room temperature in 6 hours (provisional firing). Next, the obtained test sample was ground by a ball mill, molded into pellets again, heated up to 1125° C. in 15 hours, retained at 1125° C. for 15 hours, and thereafter cooled down to room temperature in 8 hours (precursor formation). Next, the obtained test sample was ground by a ball mill, molded into pellets again, heated up to 1235° C. in 20 hours, retained at 1235° C. for 36 hours, and thereafter cooled down to room temperature in 12 hours (firing). Thereby, a solid electrolyte material as a pelletized sintered body was obtained. In the obtained solid electrolyte material, the molar ratio of Li, La and Zr was Li:La:Zr=7:3:2. Further, in the obtained solid electrolyte material, the Al content was 0.19% by weight and the Si content was 0.31% by weight. The composition of Li was determined using an atomic absorption analysis method, and the composition of other elements was determined using an ICP emission spectral analysis method.

Examples 2 to 5

A solid electrolyte material was obtained in the same manner as Example 1 except for modifying the amount of the Al source and the Si source as in the following Table 1.

Comparative Example 1

A solid electrolyte material was obtained in the same manner as Example 1 except for not using the Al source and the Si source.

EVALUATIONS (Denseness Evaluation)

The denseness of the solid electrolyte material obtained in each of Examples 1 to 5 and Comparative Example 1 was evaluated. First, a dry weight of the solid electrolyte material was measured, and next a volume was calculated from an actual size of the solid electrolyte material to calculate a sintered density (g/cm$^3$) by dividing the dry weight by the volume. Further, a sintered density (%) as a relative density was calculated from the sintered density and a theoretical density. A theoretical density (5.115 g/cm$^3$) of Li$_7$La$_3$Zr$_2$O$_{12}$ having neither Al nor Si was used for the theoretical density. The obtained results are shown in Table 1 and FIG. 2.

TABLE 1

| | Al (wt %) | Si (wt %) | Al/Si | SINTERED DENSITY (g/cm$^3$) | SINTERED DENSITY (%) |
|---|---|---|---|---|---|
| COMPARATIVE EXAMPLE 1 | 0 | 0 | — | 4.71 | 92.0 |
| EXAMPLE 1 | 0.19 | 0.31 | 0.61 | 4.77 | 93.2 |
| EXAMPLE 2 | 0.36 | 0.43 | 0.83 | 4.85 | 94.8 |
| EXAMPLE 3 | 1.29 | 0.28 | 4.80 | 4.95 | 96.8 |
| EXAMPLE 4 | 1.67 | 0.14 | 11.9 | 4.76 | 93.0 |
| EXAMPLE 5 | 1.33 | 0.008 | 166 | 4.46 | 87.2 |

Figure 2:
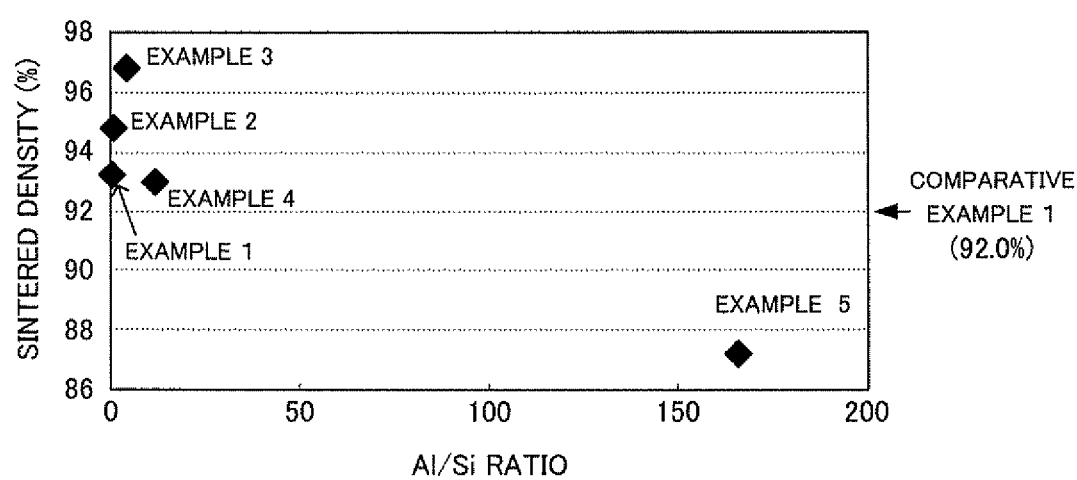
FIG. 2 is a result of evaluating denseness of a solid electrolyte material obtained in each of Examples 1 to 5 and Comparative Example 1.

As shown in Table 1 and FIG. 2, the solid electrolyte material with high sintered density and favorable denseness was obtained in each of Examples 1 to 4. On the other hand, in Example 5, the sintered density was as low as 87.2%, which was lower than that in Comparative Example 1. However, validity of this result may be easily understood in consideration of a comparison purpose thereof. That is to say, considering that the Si content in Example 5 is an extremely slight amount, this is conceived to be a result of showing the deterioration of denseness due to the addition of Al. In other words, this is conceived to be a result of showing that the influence of denseness deterioration due to the addition of Al was larger than the influence of denseness improvement due to the addition of Si.

When Example 5 (the system such that Al and Si were added) and Comparative Example 1 (the system such that neither Al nor Si was added) are compared, the result seems invalid at first sight; however, in the case of assuming a solid electrolyte material to which only Al was added to regard the solid electrolyte material as a comparison purpose, Example 5 is conceived to show a result of improving denseness by adding Si. Similarly, in the case of regarding the solid electrolyte material to which only Al was added as a comparison purpose, Examples 1 to 4 are conceived to show that denseness is greatly improved.

(X-Ray Diffraction Measurement)

Figure 3:
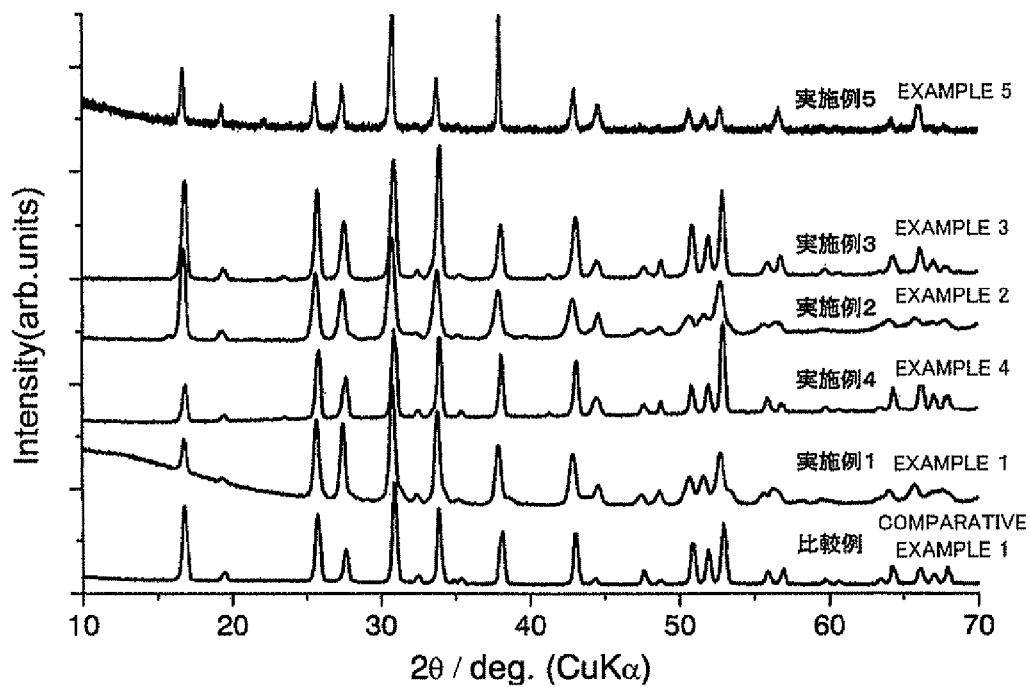
FIG. 3 is a result of measuring XRD of a solid electrolyte material obtained in each of Examples 1 to 5 and Comparative Example 1.

X-ray diffraction (XRD) measurement using a CuKα ray was performed for the solid electrolyte material obtained in each of Examples 1 to 5 and Comparative Example 1. The results are shown in FIG. 3. As shown in FIG. 3, approximately the same peak was confirmed in Examples 1 to 5 and Comparative Example 1, so that it was suggested that Si contained in the solid electrolyte material had no influence on a crystal structure of bulk but acted on an interface in the grain boundary.

(Li Ion Conductance Measurement)

The measurement of Li ion conductance (room temperature) by an alternating current impedance method was performed for the solid electrolyte material obtained in Examples 1 to 5 and Comparative Example 1. Impedance/gain phase analyzer 1260™ manufactured by SOLARTRON was used for the measurement, and the measurement conditions were an applied voltage of 10 mV and a measuring frequency range of 3.2 MHz to 10 Hz or 32 MHz to 10 Hz. The results are shown in Table 2 and FIG. 4.

TABLE 2

| | Al (wt %) | Si (wt %) | Al/Si | Li + CONDUCTANCE (S/cm) |
|---|---|---|---|---|
| COMPARATIVE EXAMPLE 1 | 0 | 0 | — | 2.0 × 10$^{-4}$ |
| EXAMPLE 1 | 0.19 | 0.31 | 0.61 | 8.3 × 10$^{-5}$ |

TABLE 2-continued

|  | Al (wt %) | Si (wt %) | Al/Si | Li+ CONDUCTANCE (S/cm) |
|---|---|---|---|---|
| EXAMPLE 2 | 0.36 | 0.43 | 0.83 | $1.0 \times 10^{-4}$ |
| EXAMPLE 3 | 1.29 | 0.28 | 4.60 | $3.9 \times 10^{-4}$ |
| EXAMPLE 4 | 1.67 | 0.14 | 11.9 | $5.8 \times 10^{-4}$ |
| EXAMPLE 5 | 1.33 | 0.008 | 166 | $1.6 \times 10^{-4}$ |

Figure 4:
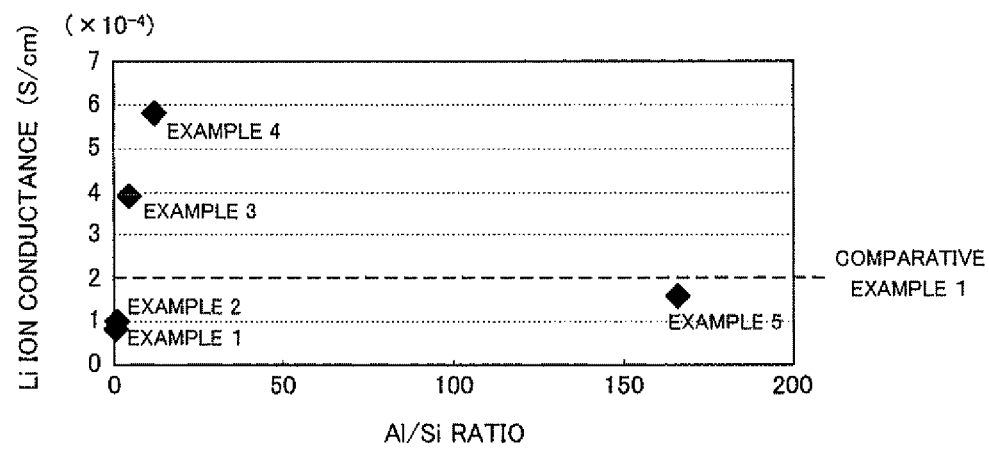
FIG. 4 is a result of measuring Li ion conductance of a solid electrolyte material obtained in each of Examples 1 to 5 and Comparative Example 1.

As shown in Table 2 and FIG. 4, Examples 3 and 4 were higher in Li ion conductance than Comparative Example 1. It was confirmed from this fact that the solid electrolyte material having higher Li ion conductance than Li ion conductance ($2.0 \times 10^{-4}$ S/cm) of Comparative Example 1 as a conventional solid electrolyte material was obtained by properly adjusting the value of Al/Si.

The reason why Examples 1 and 2 were lower in Li ion conductance than Comparative Example 1 is not clear, and in the result of XRD of the FIG. 3, Examples 1 and 2 are somewhat broader and lower in crystallinity than Comparative Example 1. In addition, Examples 1 and 2 are larger in the content of Si to Al (Al/Si is smaller). It may be suggested from the above facts that too much Si serves advantageously for the improvement of denseness while bringing the deterioration of crystallinity, which causes the deterioration of Li ion conductance.

On the other hand, the reason why Example 5 was lower in Li ion conductance than Comparative Example 1 is also not clear, and in the result of XRD of the FIG. 3, Example 5 is high in crystallinity similarly to Comparative Example 1. In addition, Example 5 is small in the content of Si to Al (Al/Si is large). It may be suggested from the above facts that too much Al serves advantageously for the improvement of crystallinity while bringing the deterioration of denseness, which causes the deterioration of Li ion conductance.

Further, it may be suggested that Examples 3 and 4 contain Al for improving crystallinity and Si for improving denseness at such a proper balance as to improve Li ion conductance. Although not being shown in the drawings, in Examples 3 and 4, it was confirmed that grain-boundary resistivity decreased in the impedance measurement. Further, it was suggested from the result of XRD of the FIG. 3 that Si contained in the solid electrolyte material had no influence on a crystal structure of bulk but acted on an interface in the grain boundary. The above facts bring a possibility of forming Li ion conduction paths of Li—Al—Si—O.

REFERENCE SIGNS LIST

1 cathode active material layer
2 anode active material layer
3 solid electrolyte layer
4 cathode current collector
5 anode current collector
6 battery case
10 lithium battery

The invention claimed is:

1. A solid electrolyte material comprising Li, La, Zr, Al, Si and O, having a garnet structure, and being a sintered body: wherein a ratio (Al/Si) of a content (% by weight) of the Al to a content (% by weight) of the Si is within a range of 0.61 to 11.9, and wherein the content of Al in the solid electrolyte material is within a range of 0.1 to 2.2 percent by weight, and the content of Si in the solid electrolyte material is within a range of 0.005 to 1.00 percent by weight.

2. The solid electrolyte material according to claim 1, wherein a ratio of the Li, the La and the Zr is Li:La:Zr=7:3:2 on a molar basis.

3. The solid electrolyte material according to claim 1, wherein Li ion conductance is $2.0 \times 10^{-4}$ S/cm or more.

4. The solid electrolyte material according to claim 1, wherein the ratio (Al/Si) of the content of the Al to the content of the Si is within a range of 4.6 to 11.9.

5. A lithium battery comprising a cathode active material layer containing a cathode active material, an anode active material layer containing an anode active material, and a solid electrolyte layer formed between the cathode active material layer and the anode active material layer;
wherein the solid electrolyte layer contains the solid electrolyte material according to claim 1.

6. The solid electrolyte material according to claim 1, wherein the content of Al is within a range of 0.1 to 1.67 percent by weight, and the content of Si is within a range of 0.005 to 0.43 percent by weight.

7. The solid electrolyte material according to claim 4, wherein the content of Al is within a range of 0.1 to 1.67 percent by weight, and the content of Si is within a range of 0.005 to 0.43 percent by weight.

* * * * *